US012713439B2

(12) United States Patent
Ma

(10) Patent No.: US 12,713,439 B2
(45) Date of Patent: Aug. 18, 2026

(54) METHOD AND APPARATUS FOR INDICATING TRANSMISSION CONFIGURATION INDICATION STATE, CHIP, AND ELECTRONIC DEVICE

(71) Applicant: Beijing Unisoc Communications Technology Co., Ltd., Beijing (CN)

(72) Inventor: Dawei Ma, Beijing (CN)

(73) Assignee: Beijing Unisoc Communications Technology Co., Ltd., Beijing (CN)

( * ) Notice: Subject to any disclaimer, the term of this patent is extended or adjusted under 35 U.S.C. 154(b) by 355 days.

(21) Appl. No.: 18/261,276

(22) PCT Filed: Feb. 16, 2022

(86) PCT No.: PCT/CN2022/076416
§ 371 (c)(1),
(2) Date: Jul. 13, 2023

(87) PCT Pub. No.: WO2022/152324
PCT Pub. Date: Jul. 21, 2022

(65) Prior Publication Data
US 2024/0073919 A1 Feb. 29, 2024

(30) Foreign Application Priority Data
Jan. 13, 2021 (CN) ......................... 202110040303.6

(51) Int. Cl.
*H04W 72/23* (2023.01)
*H04L 1/1822* (2023.01)
(Continued)

(52) U.S. Cl.
CPC ......... *H04W 72/232* (2023.01); *H04L 5/0094* (2013.01)

(58) Field of Classification Search
CPC .. H04W 72/232; H04W 72/23; H04L 5/0094; H04L 1/1819; H04L 1/1887;
(Continued)

(56) References Cited

U.S. PATENT DOCUMENTS

2019/0320469 A1 10/2019 Huang et al.
2021/0160879 A1* 5/2021 Lin .................. H04W 72/0453
2023/0336284 A1* 10/2023 Gao .................. H04B 7/06952

FOREIGN PATENT DOCUMENTS

CA 2582923 A1 1/2008
CN 110380834 A 10/2019
CN 110663282 A 1/2020

OTHER PUBLICATIONS

International Search Report (PCT/CN2022/076416); Date of Mailing: May 11, 2022.

(Continued)

*Primary Examiner* — Jae Y Lee
*Assistant Examiner* — Nam P. Cao
(74) *Attorney, Agent, or Firm* — Wiersch Law Group

(57) ABSTRACT

A method and apparatus for indicating a TCI state. The method includes: determining, based on a structure of second DCI signaling used to deactivate a SPS PDSCH resource, first DCI signaling used to indicate a currently activated TCI state such that the first DCI signaling does not schedule a PDSCH; and sending the first DCI signaling. A code point of a TCI field and/or of a HARQ process number field of the first DCI signaling is associated with the currently activated TCI state. A code point of a MCS field of the first DCI signaling is all 1. If a PDSCH FDRA type is Type 1, a code point of an FDRA field of the first DCI signaling is all 1, otherwise the code point of the FDRA field of the first DCI signaling is all 0.

18 Claims, 2 Drawing Sheets

(51) Int. Cl.
*H04L 5/00* (2006.01)
*H04W 72/232* (2023.01)

(58) Field of Classification Search
CPC ... H04L 1/1896; H04L 5/0053; H04L 5/0055; H04L 5/0092; H04L 1/1822
See application file for complete search history.

(56) References Cited

OTHER PUBLICATIONS

European Search Report issued in corresponding EP Application 22739199.2, issued Jul. 15, 2024, 12 pages.
Procedure-of-cross-slot-scheduling-power-saving-techniques.
Cross-carrier-scheduling-with-different-numerologies.
Chinese Office Action(202110040303.6 ); Date of Mailing: Sep. 30, 2024(15 pages).
Draft_Minutes_report_RAN1#AH_1901_v010.
RP-200319—Status report for WI on Multi-RAT Dual-Connectivity and Carrier Aggregation enhancements.

* cited by examiner

METHOD AND APPARATUS FOR INDICATING TRANSMISSION CONFIGURATION INDICATION STATE, CHIP, AND ELECTRONIC DEVICE

CROSS-REFERENCE TO RELATED APPLICATIONS

The present application is a National Phase of International Application No. PCT/CN2022/076416, filed on Feb. 16, 2022, which claims priority to Chinese Patent Application No. 202110040303.6, filed on Jan. 13, 2011, the contents of which are incorporated herein by reference in their entireties.

TECHNICAL FIELD

The present disclosure relates to the technical field of communications, and in particular, to a method and an apparatus for indicating a transmission configuration indication (TCI) state, a chip, and an electronic device.

BACKGROUND

Based on a 3GPP new radio (NR) protocol, an optimal transceiving beam is determined between a base station and a user through beam training, to improve transmission reliability of uplink and downlink signals through the optimal transceiving beam. During beam training and reporting, a terminal stores a receiving beam corresponding to each reported transmitting beam. When the terminal has only one receiving beam, there is no need to train and select a receiving beam.

In an actual deployment environment, not only uplink and downlink data channels and control channels usually use a transceiving beam in a same direction for communication, channels in a plurality of carriers may also use a transceiving beam in a same direction. Therefore, in a standardization process of Rel-17 version of the NR system, a unified TCI framework is introduced to further enhance the multiple-input multiple-output (MIMO) technology, thereby simultaneously indicating that uplink and downlink control channels and data channels in one or more carriers use a transceiving beam in a same direction.

In the unified TCI framework, a 5G base station (gNB) configures, through radio resource control (RRC) signaling, a TCI state pool including a plurality of TCI states. Each TCI state is used to indicate transmitting beam information. Then, the gNB activates one or more TCI states in the TCI state pool through media access control (MAC) control element (CE) (MAC CE) signaling. Finally, the gNB indicates one of the TCI states through downlink control information (DCI) signaling. After the DCI signaling is effective, the corresponding uplink and downlink channels in the one or more carriers uses a transmitting beam indicated by the TCI state for transmission. A receiving end uses a corresponding receiving beam based on the indicated transmitting beam for reception.

In terms of signaling design, to ensure reliability of beam indication, current DCI signaling used to indicate a TCI state needs to schedule a physical downlink shared channel (PDSCH). After user equipment (UE), i.e., a device receiving the DCI signaling, successfully decodes the DCI, the UE needs to further successfully decode the PDSCH and feed acknowledge character (ACK) information back to indicate that beam indication is succeeded. In fact, the UE may obtain beam indication information after successfully decoding the DCI. However, if a failure in decoding the PDSCH causes the UE to feed back negative acknowledge character (NACK) information, the gNB determines that the beam indication fails. Therefore, scheduling a PDSCH may reduce the probability of a successful beam indication.

SUMMARY

To resolve a problem in the related art that a beam indication success probability is reduced because a PDSCH needs to be scheduled to indicate a TCI state, the present disclosure provides a method and apparatus for indicating a TCI state, a chip, and an electronic device. The present disclosure further provides a computer-readable storage medium.

Embodiments of the present disclosure adopt the following technical solution:

According to a first aspect, the present disclosure provides a method for indicating a transmission configuration indication (TCI) state, including: determining, based on a structure of a second downlink control information (DCI) signaling for deactivating a semi-persistent (SPS) physical downlink shared channel (PDSCH) resource, a first DCI signaling configured to indicate a currently activated TCI state such that the first DCI signaling does not schedule a PDSCH, a code point of a TCI field and/or a code point of a hybrid automatic repeat request (HARD) process number field of the first DCI signaling is associated with the currently activated TCI state, a code point of a modulation and coding scheme (MCS) field of the first DCI signaling is all 1, in response to a PDSCH frequency domain resource assignment (FDRA) type being Type 1, a code point of an FDRA field of the first DCI signaling is all 1, otherwise the code point of the FDRA field of the first DCI signaling is all 0; and sending the first DCI signaling.

In one or more embodiments, a code point of a new data indicator (NDI) field of the first DCI signaling is 0; and a code point of a redundancy version (RV) field of the first DCI signaling is 01, 10, or 11.

In one or more embodiments: the first DCI signaling is scrambled by using first scrambling information, the first scrambling information is scrambling information for TCI, and the first scrambling information is different from a configured scheduling-radio network temporary identifier (CS-RNTI) used for scrambling the second DCI signaling.

In one or more embodiments: the TCI field of the first DCI signaling is configured to indicate one TCI state, and all code points of the HARQ process number field of the first DCI signaling are not associated with the TCI state.

In one or more embodiments: the TCI field of the first DCI signaling is configured to indicate two TCI states, and all code points of the HARQ process number field of the first DCI signaling are not associated with the TCI states.

In one or more embodiments: the TCI field of the first DCI signaling is configured to indicate one TCI state, and the HARQ process number field of the first DCI signaling is configured to indicate one TCI state.

In one or more embodiments: the RV field of the first DCI signaling is configured to point to one or two TCI states indicated by the first DCI signaling, to select a currently indicated TCI state.

In one or more embodiments: the RV field of the first DCI signaling is configured to indicate that the first DCI signaling is applicable to an uplink channel and/or a downlink channel.

In one or more embodiments: the NDI field of the first DCI signaling is configured to point to one TCI state indicated by the first DCI signaling, to select a currently indicated TCI state, or the NDI field of the first DCI signaling is configured to indicate that the first DCI signaling is applicable to an uplink channel and/or a downlink channel.

According to a second aspect, the present disclosure provides an apparatus for indicating a transmission configuration indication (TCI) state, including a signaling determining module and a signaling sending module. The signaling determining module is configured to determine, based on a structure of second downlink control information (DCI) signaling for deactivating a semi-persistent (SPS) physical downlink shared channel (PDSCH) resource, first DCI signaling configured to indicate a currently activated TCI state such that the first DCI signaling does not schedule a PDSCH, a code point of a TCI field and/or a code point of a hybrid automatic repeat request (HARQ) process number field of the first DCI signaling is associated with the currently activated TCI state, a code point of a modulation and coding scheme (MCS) field of the first DCI signaling is all 1, and in response to a PDSCH frequency domain resource assignment (FDRA) type being Type 1, a code point of an FDRA field of the first DCI signaling is all 1, otherwise the code point of the FDRA field of the first DCI signaling is all 0. The signaling sending module is configured to send the first DCI signaling.

According to a third aspect, the present disclosure provides a communication chip, including a processor configured to execute a computer program instruction stored in a memory, where when the computer program instruction is executed by the processor, the communication chip is triggered to perform steps of the method according to the first aspect.

According to a fourth aspect, the present disclosure provides an electronic device, including a memory configured to store a computer program instruction and a processor configured to execute the computer program instruction, where when the computer program instruction is executed by the processor, the electronic device is triggered to perform steps of the method according to the first aspect.

According to a fifth aspect, the present disclosure provides a non-transitory computer-readable storage medium, where the computer-readable storage medium stores a computer program, and when the computer program runs on a computer, the computer is enabled to perform the method according to the first aspect.

DESCRIPTION OF EMBODIMENTS

To better illustrate the objective, technical solutions and advantages of the present disclosure, the technical solutions in the present disclosure are described below with reference to specific embodiments and corresponding drawings of the present disclosure. It is appreciated that, the described embodiments are some rather than all of the embodiments of the present disclosure. All other embodiments obtained by those of ordinary skill in the art based on the embodiments of the application without creative efforts should fall within the protection scope of the application.

The terms used in embodiments of the present disclosure are used only to explain the specific embodiments of the present disclosure, and are not intended to limit the present disclosure.

To resolve the problem in the related art that the beam indication success probability is reduced because the PDSCH needs to be scheduled to indicate the TCI state, the present disclosure provides a method for indicating a TCI state. In an existing NR protocol, a gNB can send DCI used to deactivate a semi-persistent (SPS) PDSCH resource (after a SPS PDSCH is scheduled once, the PDSCH resource is continuously sent for a specific period of time). The DCI needs to feed back ACK/NACK information, but does not schedule the PDSCH. That is, UE receiving the DCI does not need to decode the PDSCH. Therefore, in the method according to embodiments of the present disclosure, beam indication DCI that meets the requirement for signaling reliability is designed on the basis of the DCI used to deactivate the SPS PDSCH resource, to avoid that the DCI fails to indicate the TCI state due to a failure in decoding the PDSCH, thereby greatly improving the beam indication success probability.

The DCI used to deactivate the SPS PDSCH resource at least includes: a new data indicator (NDI) field, and the NDI is used to indicate whether new data is scheduled; a redundancy version (RV) field, and the RV is used to indicate an RV used for transmission; a hybrid automatic repeat request (HARQ) process number field, and the HARQ informs a base station whether a PDSCH is successfully received by feeding back ACK/NACK information; a modulation and coding scheme (MCS) field, and the MCS is used to indicate a modulation and coding configuration of data in the PDSCH; and a frequency domain resource assignment (FDRA) field, and the FDRA is used to indicate a frequency domain resource size of the PDSCH.

In the DCI used to deactivate the SPS PDSCH resource, the fields are configured as follows: a code point of the NDI field is 0.

If an SPS PDSCH resource is configured, a code point of the HARQ process number field is all 0, otherwise the code point of the field indicates the deactivated SPS PDSCH resource.

A code point of the RV field is all 0. A code point of the MCS field is all 1. If a PDSCH FDRA type is Type 1, a code point of the FDRA field is all 1, otherwise the code point of the field is all 0.

Figure 1:
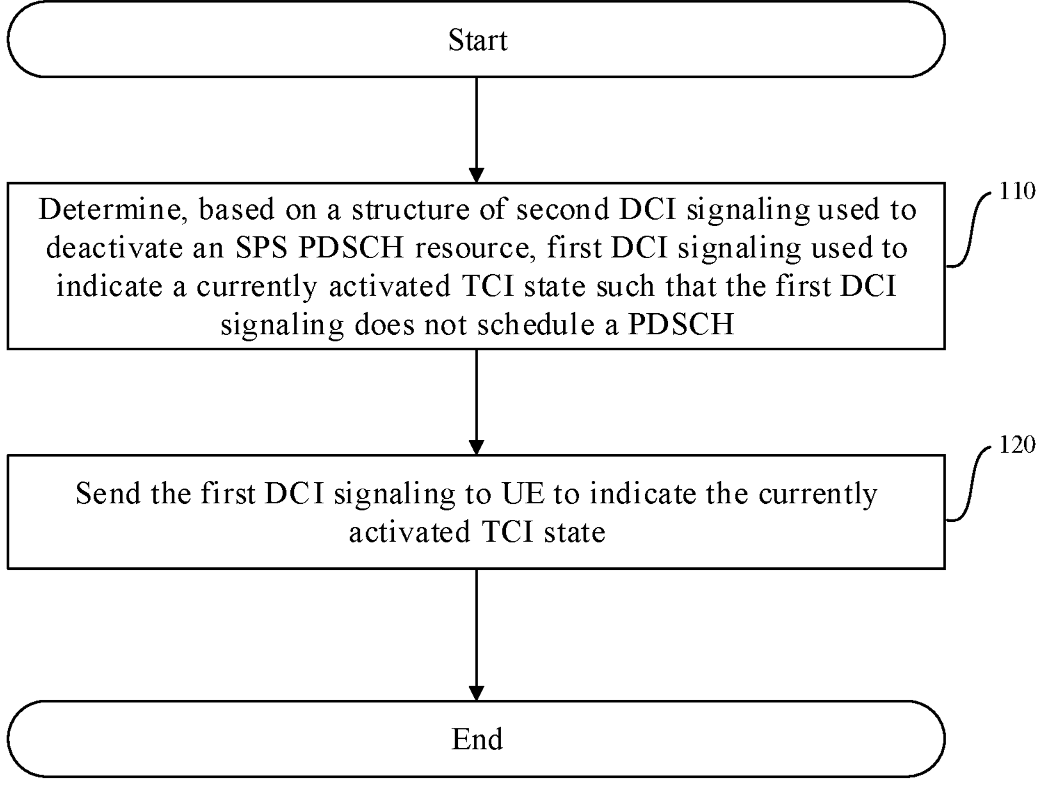
FIG. 1 is a flowchart of a method for indicating a TCI state according to one or more embodiments of the present disclosure.

In some embodiments, DCI used to indicate a TCI state is determined based on the DCI used to deactivate the SPS PDSCH resource such that the DCI used to indicate the TCI state does not invoke a PDSCH resource. FIG. 1 is a flowchart of a method for indicating a TCI state according to some embodiments. As shown in FIG. 1, a gNB performs the following steps to send DCI signaling indicating a TCI state to UE.

In S110, first DCI signaling used to indicate a currently activated TCI state is determined based on a structure of second DCI signaling used to deactivate an SPS PDSCH resource such that the first DCI signaling does not schedule a PDSCH.

In the first DCI signaling determined in S110, a code point of a TCI field and/or a code point of a HARQ process number field of the first DCI signaling is associated with the currently activated TCI state (a TCI state activated by MAC CE signaling in a TCI state pool configured by RRC signaling). In this way, the currently activated TCI state can be identified by parsing the code point of the TCI field and/or the code point of the HARQ process number field of the first DCI signaling.

In some embodiments, a first TCI state activated in a MAC CE is associated with a first code point of the TCI field or the HARQ process number field, and a second TCI state activated in the MAC CE is associated with a second code point of the TCI field or the HARQ process number field. In this way, the first TCI state activated in the MAC CE can be determined by parsing the first code point of the TCI field or the HARQ process number field, and the second TCI state activated in the MAC CE can be determined by parsing the second code point of the TCI field or the HARQ process number field.

In some embodiments, the TCI state pool configured by the RRC signaling includes 8 TCI states with numbers 0 to 7. Three least significant bits of the code point of the HARQ process number field are used to indicate an associated TCI field. Values 0 to 7 of the three least significant bits of the code point correspond to the numbers of the TCI states.

Further, to prevent the first DCI signaling from invoking a PDSCH resource, in the first DCI signaling determined in S110, a configuration of the second DCI signaling used to deactivate the SPS PDSCH resource continues to be used. A code point of an MCS field of the first DCI signaling is all 1. If a PDSCH FDRA type is Type 1, a code point of an FDRA field of the first DCI signaling is all 1, otherwise the code point of the FDRA field of the first DCI signaling is all 0. After S110 is performed to determine the first DCI signaling, S120 is performed to send the first DCI signaling. The first DCI signaling is sent to the UE to indicate the currently activated TCI state.

When the UE receives the first DCI signaling, since the first DCI signaling does not schedule the PDSCH, the UE only needs to decode the first DCI signaling and feed back (feed ACK back if the decoding succeeds or feed NACK back if the decoding fails), and does not need to decode the PDSCH. This avoids the situation that DCI fails to indicate a TCI state due to a failure to decode the PDSCH, and thus greatly improves the beam indication success probability.

In S110, because the first DCI signaling used to indicate the currently activated TCI state is determined based on the structure of the second DCI signaling used to deactivate the SPS PDSCH resource, the structure of the second DCI signaling is adjusted to determine the first DCI signaling to prevent the first DCI signaling from being identified as signaling used to deactivate the SPS PDSCH resource.

In some embodiments of S110, in the first DCI signaling determined in S110. A code point of a TCI field and/or a code point of a HARQ process number field of the first DCI signaling is associated with the currently activated TCI state. If a PDSCH FDRA type is Type 1, a code point of an FDRA field of the first DCI signaling is all 1, otherwise the code point of the FDRA field of the first DCI signaling is all 0. A code point of an MCS field of the first DCI signaling is all 1. A code point of an NDI field of the first DCI signaling is 0. A code point of an RV field of the first DCI signaling is 01, 10, or 11 (the code point of the RV field of the first DCI signaling is not 00).

The code point of the RV field of the first DCI signaling may be pre-determined. For example, it is determined that when the DCI signaling is used to indicate the currently activated TCI state, the code point of the RV field of the DCI signaling is 01. Alternatively, the code point of the RV field of the first DCI signaling may be used to carry other control information, provided that the code point of the RV field of the DCI signaling used to indicate the currently activated TCI state is not 00.

In some embodiments, DCI signaling needs to be scrambled in an actual application scenario. For example, the second DCI signaling used to deactivate the SPS PDSCH resource is scrambled by using a configured scheduling-radio network temporary identifier (CS-RNTI) used for downlink SPS scheduling or uplink grant configuration. For example, the first DCI signaling used to indicate the currently activated TCI state is scrambled by using the CS-RNTI.

In some embodiments, scrambling information used for TCI is configured, and the first DCI signaling used to indicate the currently activated TCI state is scrambled by using the scrambling information used for TCI. The scrambling information used for TCI is different from the CS-RNTI used to scramble the second DCI signaling used to deactivate the SPS PDSCH resource such that the DCI signaling used to indicate the currently activated TCI state and the DCI signaling used to deactivate the SPS PDSCH resource can be distinguished through a difference in the scrambling information.

Figure 2:
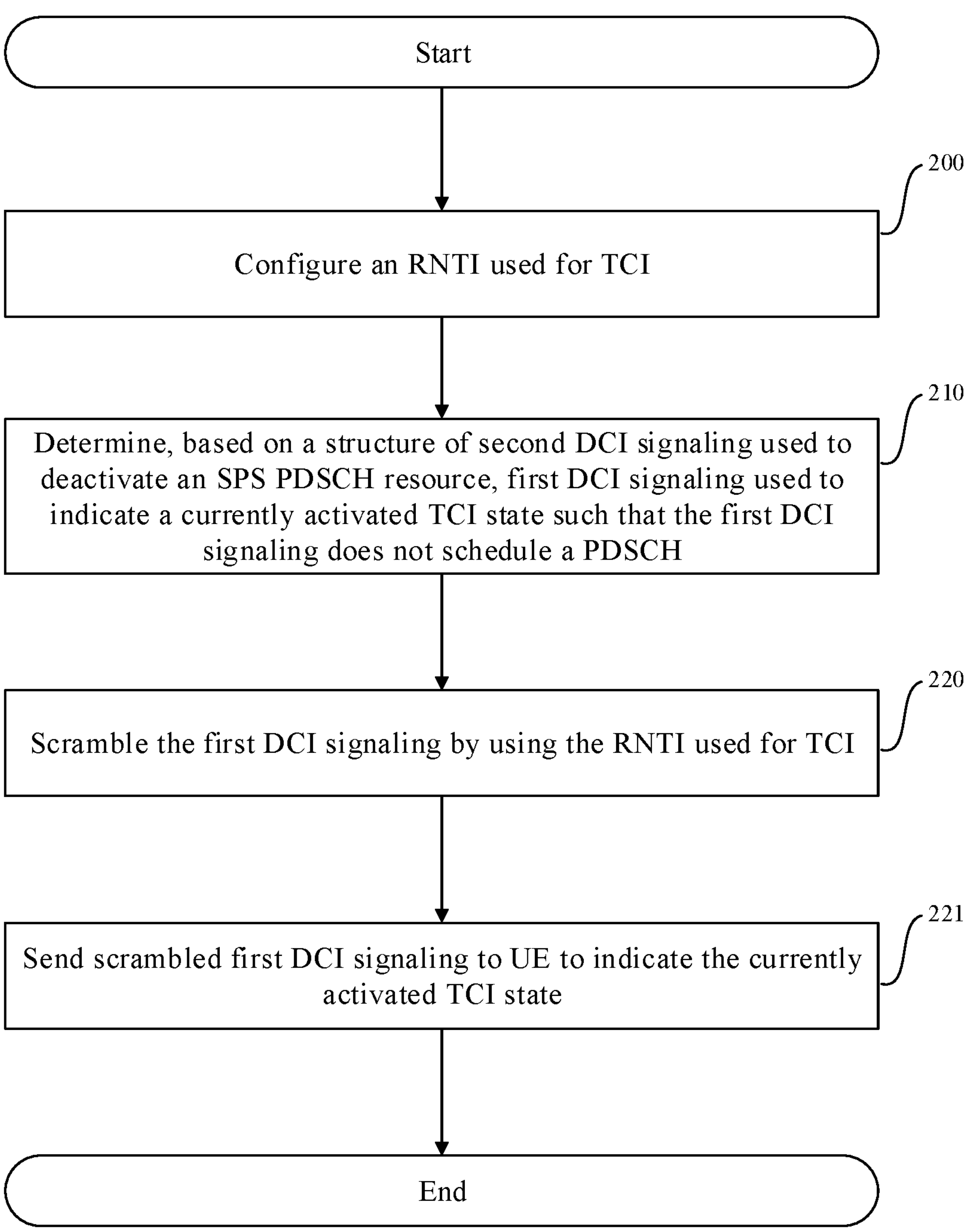
FIG. 2 is a flowchart of a method for indicating a TCI state according to one or more embodiments of the present disclosure.

FIG. 2 is a flowchart of a method for indicating a TCI state according to one or more embodiments of the present disclosure. As shown in FIG. 2, a gNB performs the following steps to send DCI signaling indicating a TCI state to UE.

In S200, an RNTI used for TCI is configured. The RNTI used for TCI is different from a CS-RNTI.

In S210, first DCI signaling used to indicate a currently activated TCI state is determined based on a structure of second DCI signaling used to deactivate an SPS PDSCH resource such that the first DCI signaling does not schedule a PDSCH.

In the first DCI signaling determined in S110: A code point of a TCI field and/or a code point of a HARQ process number field of the first DCI signaling is associated with the currently activated TCI state. A code point of an MCS field of the first DCI signaling is all 1. If a PDSCH FDRA type is Type 1, a code point of an FDRA field of the first DCI signaling is all 1, otherwise the code point of the FDRA field of the first DCI signaling is all 0.

In S220, the first DCI signaling is scrambled by using the RNTI used for TCI.

In S221, scrambled first DCI signaling is sent to the UE to indicate the currently activated TCI state.

Since the DCI signaling used to indicate the currently activated TCI state and the DCI signaling used to deactivate the SPS PDSCH resource are distinguished through differences in scrambling information, in the first DCI signaling determined in S210, code points of an NDI field and a RV field do not need to be particularly limited.

The code point of the NDI field of the first DCI signaling may be pre-determined. For example, it is determined that when the DCI signaling is used to indicate the currently activated TCI state, the code point of the NDI field of the DCI signaling is 0; or it is determined that when the DCI signaling is used to indicate the currently activated TCI state, the code point of the NDI field of the DCI signaling is 1. Alternatively, the code point of the NDI field of the first DCI signaling may be used to carry other control information.

The code point of the RV field of the first DCI signaling may be pre-determined. For example, it is determined that when the DCI signaling is used to indicate the currently activated TCI state, the code point of the RV field of the DCI signaling is 01. Alternatively, the code point of the RV field of the first DCI signaling may be used to carry other control information.

The code point of the TCI field and/or the code point of the HARQ process number field of the first DCI signaling is associated with the currently activated TCI state. That is, in an actual application scenario, the currently activated TCI state may be indicated by using the TCI field, the currently activated TCI state may be indicated by using the HARQ process number field, or the currently activated TCI state may be indicated by using both the TCI field and the HARQ process number field.

In some embodiments of S110 (or S210), the TCI field of the first DCI signaling determined in S110 (or S210) is used to indicate one TCI state, and all code points of the HARQ process number field of the first DCI signaling are not associated with the TCI state. In this way, after the UE receives the first DCI signaling, the currently activated TCI state can be determined by parsing only the TCI field.

Communication channels are classified into an uplink channel and a downlink channel. The uplink channel and the downlink channel may be implemented based on a same TCI state or different TCI states. Therefore, in an actual application scenario, when the currently activated TCI state is indicated, an uplink and downlink state corresponding to the currently activated TCI state (indicating whether the currently activated TCI state corresponds to the uplink channel or the downlink channel) also needs to be indicated.

In view of the requirement to indicate the uplink and downlink state, in some embodiments, before the DCI signaling used to indicate the currently activated TCI state is sent, it is pre-determined whether the DCI signaling to be subsequently sent is for the uplink state or the downlink state. For example, the gNB notifies the UE that the TCI state of the uplink channel is subsequently indicated, and then sends the DCI signaling. The UE receives and decodes the DCI signaling to obtain the TCI state, and automatically uses the obtained TCI state for the uplink channel.

In some embodiments of S110 (or S210), in the first DCI signaling determined in S110 (or S210), the RV field of the first DCI signaling may carry indication information (for example, in the first DCI signaling determined in S110, the code point of the RV field of the first DCI signaling is 01, 10, or 11, which may correspond to three different types of indication information). Therefore, in S110 (or S210), the RV field of the first DCI signaling indicates whether the TCI state indicated by the TCI field of the first DCI signaling corresponds to the uplink channel or the downlink channel.

In some embodiments of S110, in the first DCI signaling determined in S110: A code point of an MCS field of the first DCI signaling is all 1. A code point of an NDI field of the first DCI signaling is 0. If a PDSCH FDRA type is Type 1, a code point of an FDRA field of the first DCI signaling is all 1, otherwise the code point of the FDRA field of the first DCI signaling is all 0. The code point of the TCI field of the first DCI signaling is associated with one activated TCI state. In other words, the TCI field is used to indicate one TCI state. All code points of the HARQ process number field of the first DCI signaling are not associated with the TCI state. The RV field of the first DCI signaling is used to indicate that the first DCI signaling is applicable to the uplink channel and/or the downlink channel. In other words, the RV field of the first DCI signaling is used to indicate whether the TCI state indicated by the TCI field of the first DCI signaling corresponds to the uplink channel or the downlink channel. For example, 01 is set to correspond to the uplink channel and 10 is set to correspond to the downlink channel. When the code point of the RV field of the first DCI signaling is 01, the TCI state indicated by the TCI field of the first DCI signaling corresponds to the uplink channel. When the code point of the RV field of the first DCI signaling is 10, the TCI state indicated by the TCI field of the first DCI signaling corresponds to the downlink channel.

In some embodiments of S110, in the first DCI signaling determined in S110, the code point of the NDI field of the first DCI signaling is 0 and cannot carry indication information. However, in some embodiments of S210, in the first DCI signaling determined in S210, the code point of the NDI field of the first DCI signaling may be 0 or 1 and can carry indication information. Therefore, in S210, the NDI field of the first DCI signaling indicates whether the TCI state indicated by the TCI field of the first DCI signaling corresponds to the uplink channel or the downlink channel.

In some embodiments of S210, in the first DCI signaling determined in S210: A code point of an MCS field of the first DCI signaling is all 1. The code point of the RV field of the first DCI signaling is 00, 01, 10, or 11. If a PDSCH FDRA type is Type 1, a code point of an FDRA field of the first DCI signaling is all 1, otherwise the code point of the FDRA field of the first DCI signaling is all 0. The code point of the TCI field of the first DCI signaling is associated with one activated TCI state. In other words, the TCI field is used to indicate one TCI state. All code points of the HARQ process number field of the first DCI signaling are not associated with the TCI state. The NDI field of the first DCI signaling is used to indicate that the first DCI signaling is applicable to the uplink channel and/or the downlink channel. In other words, the NDI field of the first DCI signaling is used to indicate whether the TCI state indicated by the TCI field of the first DCI signaling corresponds to the uplink channel or the downlink channel. For example, 0 is set to correspond to the uplink channel and 1 is set to correspond to the downlink channel. When the code point of the NDI field of the first DCI signaling is 0, the TCI state indicated by the TCI field of the first DCI signaling corresponds to the uplink channel. When the code point of the NDI field of the first DCI signaling is 1, the TCI state indicated by the TCI field of the first DCI signaling corresponds to the downlink channel.

The HARQ process number field of the first DCI signaling has no specific purpose. Therefore, the HARQ process number field may use any code point. For example, the code point of the HARQ process number field is all 0.

When all code points of the HARQ process number field are not associated with the TCI state, the code point of the HARQ process number field may carry indication information other than the TCI state. Therefore, in S110 (or S210), the HARQ process number field of the first DCI signaling indicates whether the TCI state indicated by the TCI field of the first DCI signaling corresponds to the uplink channel or the downlink channel.

In some embodiments of S110 (or S210), in the first DCI signaling determined in S110 (or S210): A code point of an MCS field of the first DCI signaling is all 1. The code point of the NDI field of the first DCI signaling is 0 (in an implementation of S210, the code point of the NDI field may alternatively be 1). The code point of the RV field of the first DCI signaling is 01, 10, or 11 (in an implementation of S210, the code point of the RV field may alternatively be 00). If a PDSCH FDRA type is Type 1, a code point of an FDRA field of the first DCI signaling is all 1, otherwise the code point of the FDRA field of the first DCI signaling is all 0. The code point of the TCI field of the first DCI signaling is associated with one activated TCI state. In other words, the TCI field is used to indicate one TCI state. All code points of the HARQ process number field of the first DCI signaling are not associated with the TCI state. The HARQ process number field of the first DCI signaling is used to indicate that the first DCI signaling is applicable to the uplink channel and/or the downlink channel. In other words, the HARQ process number field of the first DCI signaling is used to indicate whether the TCI state indicated by the TCI field of the first DCI signaling corresponds to the uplink channel or the downlink channel. For example, two least significant bits of the code point of the HARQ process number field are set to indicate the uplink and downlink state. 01 is set to correspond to the uplink channel and 10 is set to correspond to the downlink channel. If the two least significant bits of the code point of the HARQ process number field of the first DCI signaling are 01, the TCI state indicated by the TCI field of the first DCI signaling corresponds to the uplink channel. If the two least significant bits of the code point of the HARQ process number field of the first DCI signaling are 10, the TCI state indicated by the TCI field of the first DCI signaling corresponds to the downlink channel.

In some embodiments of S110 (or S210), the TCI field of the first DCI signaling determined in S110 (or S210) is used to indicate two TCI states, and all code points of the HARQ process number field of the first DCI signaling are not associated with the TCI state. Alternatively, in S110 (or S210), the TCI field of the first DCI signaling determined in S110 (or S210) is used to indicate one TCI state, and the HARQ process number field of the first DCI signaling is used to indicate one TCI state. In this way, two TCI states respectively corresponding to the uplink channel and the downlink channel can be indicated by using one piece of DCI signaling, thereby greatly reducing the quantity of pieces of DCI signaling.

In some embodiments, the TCI field is set to indicate two TCI states, the TCI field may indicate two activated TCI states, or the TCI field may indicate only one activated TCI state. When the TCI field is set to indicate one TCI state and the HARQ process number field is set to indicate one TCI state, the TCI field and the HARQ process number field indicate two activated TCI states in total, or only the TCI state indicated by the TCI field or the HARQ process number field is an activated TCI state. In other words, only one of the two TCI states indicated by the DCI signaling may be a valid (an activated) TCI state, or both may be valid (activated) TCI states.

In some embodiments of S110 (or S210), the RV field is used to indicate the valid TCI state. For example, in an implementation of S110 (or S210), in the first DCI signaling determined in S110 (or S210): A code point of an MCS field of the first DCI signaling is all 1. The code point of the NDI field of the first DCI signaling is 0 (in an implementation of S210, the code point of the NDI field may alternatively be 1). If a PDSCH FDRA type is Type 1, a code point of an FDRA field of the first DCI signaling is all 1, otherwise the code point of the FDRA field of the first DCI signaling is all 0. The code point of the TCI field of the first DCI signaling is associated with two TCI states. In other words, the TCI field is used to indicate two TCI states. All code points of the HARQ process number field of the first DCI signaling are not associated with the TCI state. The RV field of the first DCI signaling is used to point to one or two of the two TCI states indicated by the TCI field of the first DCI signaling, to further select a currently indicated TCI state. For example, 01 is set to indicate that a first TCI state is valid, 10 is set to indicate that a second TCI state is valid, and 11 is set to indicate that both TCI states are valid. If the code point of the RV field of the first DCI signaling is 01, the first TCI state indicated by the TCI field of the first DCI signaling is an activated TCI state, and the second TCI state indicated by the TCI field of the first DCI signaling is invalid data. If the code point of the RV field of the first DCI signaling is 10, the second TCI state indicated by the TCI field of the first DCI signaling is an activated TCI state, and the first TCI state indicated by the TCI field of the first DCI signaling is invalid data. If the code point of the RV field of the first DCI signaling is 11, the first TCI state and the second TCI state indicated by the TCI field of the first DCI signaling are both activated TCI states.

In some embodiments of S110 (or S210), the HARQ process number field is used to indicate the valid TCI state. For example, in an implementation of S110, in the first DCI signaling determined in S110 (or S210): A code point of an MCS field of the first DCI signaling is all 1. The code point of the NDI field of the first DCI signaling is 0 (in an implementation of S210, the code point of the NDI field may alternatively be 1). The code point of the RV field of the first DCI signaling is 01, 10, or 11 (in an implementation of S210, the code point of the RV field may alternatively be 00). If a PDSCH FDRA type is Type 1, a code point of an FDRA field of the first DCI signaling is all 1, otherwise the code point of the FDRA field of the first DCI signaling is all 0. The code point of the TCI field of the first DCI signaling is associated with two TCI states. In other words, the TCI field is used to indicate two TCI states. All code points of the HARQ process number field of the first DCI signaling are not associated with the TCI states. In addition, the HARQ process number field of the first DCI signaling is used to point to one or two of the two TCI states indicated by the TCI field of the first DCI signaling, to further select a currently indicated TCI state. For example, 01 is set to indicate that a first TCI state is valid, 10 is set to indicate that a second TCI state is valid, and 11 is set to indicate that both TCI states are valid. If the two least significant bits of the code point of the HARQ process number field of the first DCI signaling is 01, the first TCI state indicated by the TCI field of the first DCI signaling is an activated TCI state, and the second TCI state indicated by the TCI field of the first DCI signaling is invalid data. If the two least significant bits of the code point of the HARQ process number field of the first DCI signaling is 10, the second TCI state indicated by the TCI field of the first DCI signaling is an activated TCI state, and the first TCI state indicated by the TCI field of the first DCI signaling is invalid data. If the two least significant bits of the code point of the HARQ process number field of the first DCI signaling is 11, the first TCI state and the second TCI state indicated by the TCI field of the first DCI signaling are both activated TCI states.

In some embodiments of S210, the NDI field may alternatively be used to indicate the valid TCI state. However, because the code point of the NDI field has only one bit, the NDI field can indicate only two types of indication information.

For example, the NDI field points to one TCI state indicated by the first DCI signaling to indicate one currently activated TCI state. For example, when the TCI field indicates two TCI states, the NDI field points to one of the TCI states; or when the TCI field indicates one TCI state and the HARQ process number field indicates one TCI state, the NDI field points to the TCI field or the HARQ process number field.

Alternatively, the NDI field indicates that one or two TCI states in the first DCI signaling are valid. For example, when the NDI field indicates that one TCI state in the first DCI signaling is valid, the TCI field indicates based on a preset rule that the first TCI state in the two TCI states is valid. Alternatively, when the TCI field indicates one TCI state and the HARQ process number field indicates one TCI state, the TCI state indicated by the TCI field is valid.

In some embodiments of S110 (or S210), before the DCI signaling used to indicate the currently activated TCI state is sent, it is pre-determined whether the DCI signaling to be subsequently sent is applicable to the uplink channel and/or the downlink channel. For example, the gNB notifies the UE that the first TCI state corresponds to the uplink channel and the second TCI state corresponds to the downlink channel in the DCI signaling used to indicate the TCI states and to be subsequently sent, and then sends the DCI signaling. The UE receives and decodes the DCI signaling to obtain the two TCI states, and automatically uses the obtained TCI states for the uplink channel and the downlink channel respectively.

In some embodiments of S110 (or S210), on the basis of using the RV field to indicate the currently activated TCI state, the HARQ process number field is further used to indicate that the first DCI signaling is applicable to the uplink channel and/or the downlink channel. For example, the two least significant bits of the code point of the HARQ process number field are set to indicate the uplink and downlink state. 01 is set to indicate that the first TCI state indicated by the TCI field corresponds to the uplink channel and the second TCI state indicated by the TCI field corresponds to the downlink channel. 10 is set to indicate that the first TCI state indicated by the TCI field corresponds to the downlink channel, and the second TCI state indicated by the TCI field corresponds to the uplink channel. Alternatively, 01 is set to indicate that the TCI state indicated by the TCI field corresponds to the uplink channel, and the TCI state indicated by the HARQ process number field corresponds to the downlink channel. 10 is set to indicate that the TCI state indicated by the TCI field corresponds to the downlink channel, and the TCI state indicated by the HARQ process number field corresponds to the uplink channel.

In some embodiments of S210, on the basis of using the RV field to indicate the currently activated TCI state, the NDI field is further used to indicate that the first DCI signaling is applicable to the uplink channel and/or the downlink channel. For example, 0 is set to indicate that the first TCI state indicated by the TCI field corresponds to the uplink channel and the second TCI state indicated by the TCI field corresponds to the downlink channel. 1 is set to indicate that the first TCI state indicated by the TCI field corresponds to the downlink channel, and the second TCI state indicated by the TCI field corresponds to the uplink channel. Alternatively, 0 is set to indicate that the TCI state indicated by the TCI field corresponds to the uplink channel, and the TCI state indicated by the HARQ process number field corresponds to the downlink channel. 1 is set to indicate that the TCI state indicated by the TCI field corresponds to the downlink channel, and the TCI state indicated by the HARQ process number field corresponds to the uplink channel.

In some embodiments of S110 (or S210), on the basis of using the HARQ process number field to indicate the currently activated TCI state, the RV field is further used to indicate that the first DCI signaling is applicable to the uplink channel and/or the downlink channel. For example, 01 is set to indicate that the first TCI state indicated by the TCI field corresponds to the uplink channel and the second TCI state indicated by the TCI field corresponds to the downlink channel. 10 is set to indicate that the first TCI state indicated by the TCI field corresponds to the downlink channel, and the second TCI state indicated by the TCI field corresponds to the uplink channel. Alternatively, 01 is set to indicate that the TCI state indicated by the TCI field corresponds to the uplink channel, and the TCI state indicated by the HARQ process number field corresponds to the downlink channel. 10 is set to indicate that the TCI state indicated by the TCI field corresponds to the downlink channel, and the TCI state indicated by the HARQ process number field corresponds to the uplink channel.

In some embodiments of S210, on the basis of using the HARQ process number field to indicate the currently activated TCI state, the NDI field is further used to indicate that the first DCI signaling is applicable to the uplink channel and/or the downlink channel. For example, 0 is set to indicate that the first TCI state indicated by the TCI field corresponds to the uplink channel and the second TCI state indicated by the TCI field corresponds to the downlink channel. 1 is set to indicate that the first TCI state indicated by the TCI field corresponds to the downlink channel, and the second TCI state indicated by the TCI field corresponds to the uplink channel. Alternatively, 0 is set to indicate that the TCI state indicated by the TCI field corresponds to the uplink channel, and the TCI state indicated by the HARQ process number field corresponds to the downlink channel. 1 is set to indicate that the TCI state indicated by the TCI field corresponds to the downlink channel, and the TCI state indicated by the HARQ process number field corresponds to the uplink channel.

In some embodiments of S110 (or S210), on the basis of using the HARQ process number field to indicate the currently activated TCI state, the HARQ process number field is further used to indicate that the first DCI signaling is applicable to the uplink channel and/or the downlink channel. For example, the two least significant bits of the code point of the HARQ process number field are set to indicate the currently activated TCI state. The third least significant bit of the code point of the HARQ process number field is set to indicate the uplink and downlink state. 0 is set to indicate that the first TCI state indicated by the TCI field corresponds to the uplink channel and the second TCI state indicated by the TCI field corresponds to the downlink channel. 1 is set to indicate that the first TCI state indicated by the TCI field corresponds to the downlink channel, and the second TCI state indicated by the TCI field corresponds to the uplink channel. Alternatively, 0 is set to indicate that the TCI state indicated by the TCI field corresponds to the uplink channel, and the TCI state indicated by the HARQ process number field corresponds to the downlink channel. 1 is set to indicate that the TCI state indicated by the TCI field corresponds to the downlink channel, and the TCI state indicated by the HARQ process number field corresponds to the uplink channel.

In some embodiments of S210, on the basis of using the NDI field to indicate the currently activated TCI state, the HARQ process number field or the RV field is further used to indicate that the first DCI signaling is applicable to the uplink channel and/or the downlink channel.

In the 1990, technological improvements can be clearly defined as hardware improvements (for example, an improvement of a circuit structure such as a diode, a transistor, or a switch) or software improvements (for example, an improvement of a method procedure). However, with the development of technologies, improvements of many method procedures can be regarded as direct improvements of hardware circuit structures. Almost all designers obtain a corresponding hardware circuit structure by programming an improved method procedure into a hardware circuit. Therefore, it is not meant that an improvement of a method procedure cannot be realized by using a hardware entity module, For example, a programmable logic device (PLD) (such as a field programmable gate array (FPGA)) is such an integrated circuit, and its logic function is determined by programming the device by an access party. A designer can "integrate" a digital apparatus onto a PLD through programming, without requiring a chip manufacturer to design and manufacture a special integrated circuit chip. Nowadays, this kind of programming replaces manual manufacturing of an integrated circuit chip and is mostly realized by using a "logic compiler". The logic compiler is similar to a software compiler used to develop and compile a program, and original code before compilation needs to be compiled in a specific programming language that is referred to as a hardware description language (HDL) herein. There are many kinds of HDLs, such as an advanced Boolean expression language (ABEL), an alternate hardware description language (AHDL), Confluence, a Cornell university programming language (CUPL), HDCal, a Java hardware description language (JHDL), Lava, Lola, MyHDL, PALASM, and a Ruby hardware description language (RHDL). At present, a very-high-speed integrated circuit hardware description language (VHDL) and Verilog are most commonly used. It should be understood by those of ordinary skill in the art that a hardware circuit of a logic method procedure can be easily obtained by using the above hardware description languages to perform logic programming on the method procedure and programming the method procedure into an integrated circuit.

Therefore, according to the method described in the above embodiments, the present disclosure further provides an apparatus for indicating a TCI state, including a signaling determining module and a signaling sending module.

The signaling determining module is configured to determine, based on a structure of second DCI signaling used to deactivate an SPS PDSCH resource, first DCI signaling used to indicate a currently activated TCI state such that the first DCI signaling does not schedule a PDSCH. A code point of a TCI field and/or a code point of a HARQ process number field of the first DCI signaling is associated with the currently activated TCI state. A code point of an MCS field of the first DCI signaling is all 1. If a PDSCH FDRA type is Type 1, a code point of an FDRA field of the first DCI signaling is all 1, otherwise the code point of the FDRA field of the first DCI signaling is all 0. The signaling sending module is configured to send the first DCI signaling.

In embodiments of this disclosure, for ease of description, when the apparatus is described, the functions are divided into various modules and described respectively, and division to the modules is merely division of logical functions. The functions of the modules/units are implemented in the same or a plurality of software and/or hardware.

The apparatuses proposed in embodiments of the present disclosure may be fully or partially integrated into a physical entity or may be physically separated. These modules may be all implemented in a form of software through processing element calling, may be all implemented in a form of hardware, or may be partially implemented in a form of software through processing element calling, and partially implemented in a form of hardware. For example, a detection module may be a separate processing element or integrated into a chip of an electronic device. Implementations of other modules are similar. In addition, all or part of these modules may be integrated or implemented independently. During the implementations, each step of the foregoing method or each of the foregoing modules may be performed through an integrated logic circuit as hardware in a processor element or through instructions as software.

For example, the foregoing modules may be one or more integrated circuits configured to implement the foregoing methods, such as one or more application-specific integrated circuits (ASICs), one or more digital signal processors (DSPs), or one or more field-programmable gate arrays (FPGAs). For another example, these modules may be integrated and implemented in a form of a system-on-a-chip (SOC).

In an actual application scenario, the methods in the embodiments shown in FIG. 1 and FIG. 2 may be implemented by a communication chip installed on a gNB. Therefore, some embodiments provides a communication chip. For example, the communication chip is installed on a gNB. The communication chip includes: a processor configured to execute a computer program instruction stored in a memory. When the computer program instruction is executed by the processor, the communication chip is triggered to perform steps of the methods described in the embodiments of the present disclosure.

Some embodiments further provides an electronic device (for example, a gNB). The electronic device includes a memory configured to store a computer program instruction and a processor configured to execute the computer program instruction. When the computer program instruction is executed by the processor, the electronic device is triggered to perform steps of the methods described in the embodiments of the present disclosure.

In some embodiments, the one or more computer programs are stored in the memory, and the one or more computer programs include instructions. When the instructions are executed by the device, the device is enabled to perform steps of the methods described in the embodiments of the present disclosure.

In some embodiments, the processor of the electronic device may be an SOC. The processor may include a central processing unit (CPU), and may further include a processor of another type. Specifically, in some embodiments, the processor of the electronic device may be a PWM control chip.

In some embodiments, the processor may include, for example, a CPU, a DSP, a microcontroller, or a digital signal processor, and may further include a GPU, an embedded neural network processing unit (NPU), and an image signal processor (ISP). The processor may further include a necessary hardware accelerator, a logic processing hardware circuit such as an ASIC, or one or more integrated circuits for controlling the execution of the program of the technical solutions of the present disclosure. In addition, the processor may have a function of operating one or more software programs, and the software program may be stored in a storage medium.

In some embodiments, the memory of the electronic device may be a read-only memory (ROM), another type of static storage device that can store static information and instructions, a random access memory (RAM), or another type of dynamic storage device that can store information and instructions; may be an electrically erasable programmable read-only memory (EEPROM), a compact disc read-only memory (CD-ROM), another optical disc storage, an optical disc storage (including a compact disc, a laser disc, an optical disc, a digital versatile disc, or a Blu ray disc), a disk storage medium, or another magnetic storage device; or may be any computer-readable medium that can be used to carry or store desired program code in a form of an instruction or a data structure and can be accessed by a computer.

In some embodiments, the processor and the memory may be integrated into a processing apparatus. More generally, the processor and the memory are independent components. The processor is configured to execute the program code stored in the memory to implement the methods described in the embodiments of the present disclosure. During specific implementation, the memory may alternatively be integrated into the processor or independent of the processor.

The devices, apparatus, and modules described in the embodiments of the present disclosure may be specifically implemented by a computer chip or entity, or implemented by a product with a specific function.

Those skilled in the art should understand that the embodiments of the present disclosure may be provided as a method, an apparatus, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media that include computer-usable program code.

In the embodiments provided in the present disclosure, if implemented in a form of a software functional unit and sold or used as a stand-alone product, any function may be stored in a computer-readable storage medium. Based on such understanding, the technical solution in this application essentially, or the part contributing to the related art, or some of the technical solutions may be embodied in a form of a software product. The computer software product is stored in a storage medium, and includes several instructions to enable a computer device (which may be a personal computer, a server, a network device, or the like) to execute all or some steps of the method according to the embodiments of this application.

In some embodiments, a computer-readable storage medium is provided. The computer-readable storage medium stores a computer program. When the computer program runs on a computer, the computer executes the methods provided in the embodiments of the present disclosure.

In some embodiments, a computer program product is provided. The computer program product includes a computer program. When the computer program runs on a computer, the computer executes of the methods provided in the embodiments of the present disclosure.

The embodiments of the present disclosure are described with reference to the flowcharts and/or block diagrams of the method, the device (apparatus), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a non-transitory computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

It should be noted that, in the embodiments of the present disclosure, the term "at least one" refers to one or more, and the term "a plurality of" refers to two or more. The term "and/or" describes associations between associated objects, and it indicates three types of relationships. For example, "A and/or B" may indicate that A exists alone, A and B coexist, or B exists alone. "A" and "B" each may be singular or plural. The character "/" usually indicates an "or" relationship between associated objects. The term "at least one of the followings" or a similar expression refers to any combination of these items, including any combination of single items or plural items. For example, at least one of a, b, and c may represent: a, b, c, a and b, a and c, b and c, or a, b, and c, where a, b, and c may be singular or plural.

In addition, terms "include", "comprise", or any other variations thereof are intended to cover non-exclusive inclusion, such that a process, method, product, or device including a series of elements not only includes those elements, but also includes other elements that are not explicitly listed, or also includes inherent elements of the process, method, product, or device. Without more restrictions, an element defined by the phrase "including a . . . " does not exclude the presence of another same element in a process, method, product, or device that includes the element.

The present disclosure may be described in general contexts of computer executable instructions executed by a computer, such as a program module. Generally, the program module includes a routine, a program, an object, a component, a data structure, and the like that perform specific tasks or implement specific abstract data types. The present disclosure may alternatively be practiced in a distributed computing environment in which a task is performed by a remote processing device connected through a communication network. In the distributed computing environment, the program module may be located in local and remote computer storage media including a storage device.

The embodiments in the present disclosure are described in a progressive manner. For same or similar parts between the embodiments, reference may be made to each other. Each embodiment focuses on a difference from other embodiments. For an apparatus embodiment, since it is basically similar to the method embodiment, the description is relatively simple, and reference can be made to the description of the method embodiment.

Those of ordinary skill in the art may be aware that units and algorithm steps described in the embodiments of the present disclosure can be implemented by electronic hardware or a combination of computer software and electronic hardware. Whether these functions are implemented by hardware or software depends on specific applications of the technical solutions and design constraints. Those of ordinary skill in the art may use different methods to implement the described functions for each specific application, but such implementation should not be considered to be beyond the scope of the present disclosure.

Those of ordinary skill in the art can clearly understand that, for convenience and brevity of description, reference may be made to corresponding processes in the foregoing method embodiment for specific working processes of the foregoing apparatuses and units. Details are not described herein again.

The above merely describes specific implementations of the present disclosure. Any person skilled in the art can easily conceive modifications or replacements within the technical scope of the present disclosure, and these modifications or replacements shall fall within the protection scope of the present disclosure. Therefore, the protection scope of the present disclosure should be subject to the protection scope of the claims.

What is claimed is:

1. A method for indicating a transmission configuration indication (TCI) state, comprising:

determining a first downlink control information (DCI) signaling configured to indicate a currently activated TCI state such that the first DCI signaling does not schedule a physical downlink shared channel (PDSCH), wherein a code point of a TCI field and/or a code point of a hybrid automatic repeat request (HARQ) process number field of the first DCI signaling is associated with the currently activated TCI state, a code point of a modulation and coding scheme (MCS) field of the first DCI signaling is all 1, a code point of a new data indicator (NDI) field of the first DCI signaling is 0, and in response to a PDSCH frequency domain resource assignment (FDRA) type being Type 1, a code point of an FDRA field of the first DCI signaling is all 1, otherwise the code point of the FDRA field of the first DCI signaling is all 0, sending the first DCI signaling, and wherein a code point of a redundancy version (RV) field of the first DCI signaling is 11.

2. The method according to claim 1, wherein the first DCI signaling is scrambled by using first scrambling information, the first scrambling information is scrambling information for TCI, and the first scrambling information is different from a configured scheduling-radio network temporary identifier (CS-RNTI) used for scrambling the second DCI signaling.

3. The method according to claim 1, wherein the TCI field of the first DCI signaling is configured to indicate one TCI state, and all code points of the HARQ process number field of the first DCI signaling are not associated with the TCI state.

4. The method according to claim 1, wherein the TCI field of the first DCI signaling is configured to indicate two TCI states, and all code points of the HARQ process number field of the first DCI signaling are not associated with the TCI states.

5. The method according to claim 1, wherein the TCI field of the first DCI signaling is configured to indicate one TCI state, and the HARQ process number field of the first DCI signaling is configured to indicate one TCI state.

6. The method according to claim 4, wherein the RV field of the first DCI signaling is configured to point to one or two TCI states indicated by the first DCI signaling, to select a currently indicated TCI state.

7. The method according to claim 3, wherein the RV field of the first DCI signaling is configured to indicate that the first DCI signaling is applicable to an uplink channel and/or a downlink channel.

8. The method according to claim 1, wherein the NDI field of the first DCI signaling is configured to point to one TCI state indicated by the first DCI signaling, to select a currently indicated TCI state.

9. An apparatus for indicating a transmission configuration indication (TCI) state, comprising:

at least one processor; and a memory configured to store instructions executable by the at least one processor;

wherein the instructions cause the at least one processor to:

determine first downlink control information (DCI) signaling configured to indicate a currently activated TCI state such that the first DCI signaling does not schedule a physical downlink shared channel (PDSCH), wherein a code point of a TCI field and/or a code point of a hybrid automatic repeat request (HARQ) process number field of the first DCI signaling is associated with the currently activated TCI state, a code point of a modulation and coding scheme (MCS) field of the first DCI signaling is all 1, and a code point of a new data indicator (NDI) field of the first DCI signaling is 0; and in response to a PDSCH frequency domain resource assignment (FDRA) type being Type 1, a code point of an FDRA field of the first DCI signaling is all 1, otherwise the code point of the FDRA field of the first DCI signaling is all 0, send the first DCI signaling, and wherein a code point of a redundancy version (RV) field of the first DCI signaling is 11.

10. A non-transitory computer-readable storage medium, wherein the computer-readable storage medium stores a computer program, and when the computer program runs on a computer, the computer is enabled to:

determine first downlink control information (DCI) signaling configured to indicate a currently activated TCI state such that the first DCI signaling does not schedule a physical downlink shared channel (PDSCH), wherein a code point of a TCI field and/or a code point of a hybrid automatic repeat request (HARQ) process number field of the first DCI signaling is associated with the currently activated TCI state, a code point of a modulation and coding scheme (MCS) field of the first DCI signaling is all 1, and a code point of a new data indicator (NDI) field of the first DCI signaling is 0; and in response to a PDSCH frequency domain resource assignment (FDRA) type being Type 1, a code point of an FDRA field of the first DCI signaling is all 1, otherwise the code point of the FDRA field of the first DCI signaling is all 0, send the first DCI signaling, and wherein a code point of a redundancy version (RV) field of the first DCI signaling is 11.

11. The method according to claim 1, wherein the determining a first DCI signaling configured to indicate a currently activated TCI state such that the first DCI signaling does not schedule a PDSCH comprises:

determining, based on a structure of a second DCI signaling for deactivating a semi-persistent (SPS) PDSCH resource, the first DCI signaling configured to indicate the currently activated TCI state such that the first DCI signaling does not schedule the PDSCH.

12. The method according to claim 1, wherein the NDI field of the first DCI signaling is configured to indicate that the first DCI signaling is applicable to an uplink channel and/or a downlink channel.

13. The apparatus according to claim 9, wherein at least one processor is configured to:

determine, based on a structure of a second DCI signaling for deactivating a semi-persistent (SPS) PDSCH resource, the first DCI signaling configured to indicate the currently activated TCI state such that the first DCI signaling does not schedule the PDSCH.

14. The apparatus for indicating a transmission configuration indication (TCI) state according to claim 9, wherein the first DCI signaling is scrambled by using first scrambling information, the first scrambling information is scrambling information for TCI, and the first scrambling information is different from a configured scheduling-radio network temporary identifier (CS-RNTI) used for scrambling the second DCI signaling.

15. The apparatus for indicating a transmission configuration indication (TCI) state according to claim 9, wherein the TCI field of the first DCI signaling is configured to indicate one TCI state, and all code points of the HARQ process number field of the first DCI signaling are not associated with the TCI state, or the TCI field of the first DCI signaling is configured to indicate two TCI states, and all code points of the HARQ process number field of the first DCI signaling are not associated with the TCI states, or the TCI field of the first DCI signaling is configured to indicate one TCI state, and the HARQ process number field of the first DCI signaling is configured to indicate one TCI state.

16. The apparatus for indicating a transmission configuration indication (TCI) state according to claim 15, wherein the RV field of the first DCI signaling is configured to point to one or two TCI states indicated by the first DCI signaling, to select a currently indicated TCI state.

17. The apparatus for indicating a transmission configuration indication (TCI) state according to claim 15, wherein the RV field of the first DCI signaling is configured to indicate that the first DCI signaling is applicable to an uplink channel and/or a downlink channel.

18. The apparatus for indicating a transmission configuration indication (TCI) state according to claim 9, wherein the NDI field of the first DCI signaling is configured to point to one TCI state indicated by the first DCI signaling, to select a currently indicated TCI state; or the NDI field of the first DCI signaling is configured to indicate that the first DCI signaling is applicable to an uplink channel and/or a downlink channel.

* * * * *